United States Patent [19]
Kyrtsos

[11] Patent Number: 5,877,455
[45] Date of Patent: Mar. 2, 1999

[54] PAYLOAD MONITORING FOR A TRACTOR-TRAILER

[75] Inventor: Christos T. Kyrtsos, Southfield, Mich.

[73] Assignee: Meritor Heavy Vehicle Systems, LLC, Troy, Mich.

[21] Appl. No.: 10,107

[22] Filed: Jan. 21, 1998

[51] Int. Cl.[6] .............................. G01G 9/00; G01G 19/08; G01G 3/14
[52] U.S. Cl. ......................... 177/1; 177/136; 177/210 FP
[58] Field of Search ............................. 177/210 FP, 136, 177/141, 1

[56] References Cited

U.S. PATENT DOCUMENTS

| | | | |
|---|---|---|---|
| Re. 26,826 | 3/1970 | Nolan | 177/210 FP |
| 4,391,338 | 7/1983 | Patashnick et al. | 177/210 FP |
| 4,651,838 | 3/1987 | Hamilton et al. | 177/141 |
| 4,854,407 | 8/1989 | Wagner | 177/141 |
| 4,941,365 | 7/1990 | Reiner et al. | 177/136 |
| 5,215,154 | 6/1993 | Kirby | 177/136 |

*Primary Examiner*—Randy W. Gibson

[57] ABSTRACT

A system for determining the weight of a vehicle includes a first axle subject to a relatively fixed axle weight. Typically, this axle is a front steering axle for a tractor-trailer combination vehicle. The load on this axle is considered known as the load does not vary significantly during the operation of the vehicle. A first accelerometer is supported on the first axle and measures the vertical acceleration of the first axle producing a first signal. Each additional axle on the vehicle, including any single rear or tandem drive axles and any trailer axles, also supports an accelerometer. The accelerometers on each of these additional axles measure the vertical acceleration of its respective axle. Each of these additional accelerometers produces a signal representative of its respective axle accelerations and these signals are combined to produce a second signal. A processor determines the vehicle weight by comparing the second signal to the first signal.

20 Claims, 1 Drawing Sheet

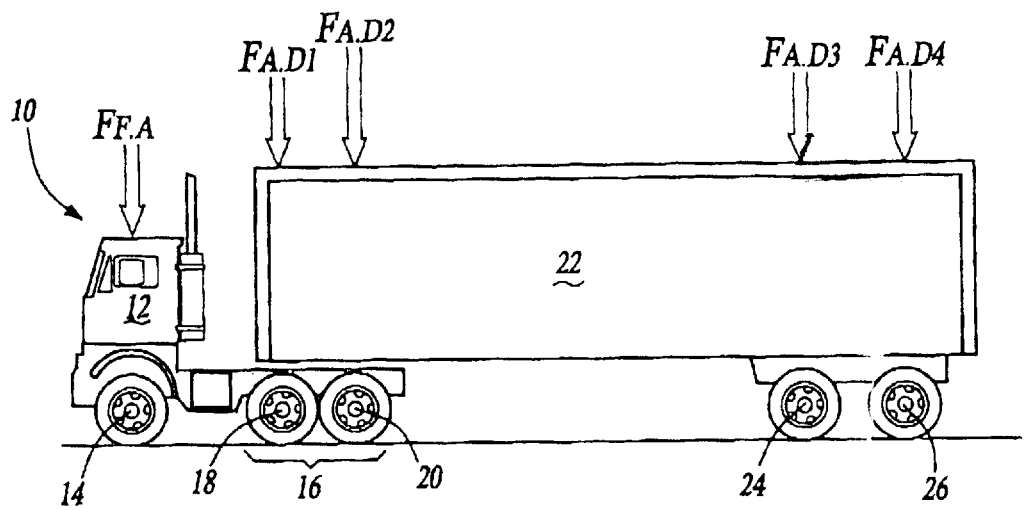
*Fig-1*
*Fig-2*
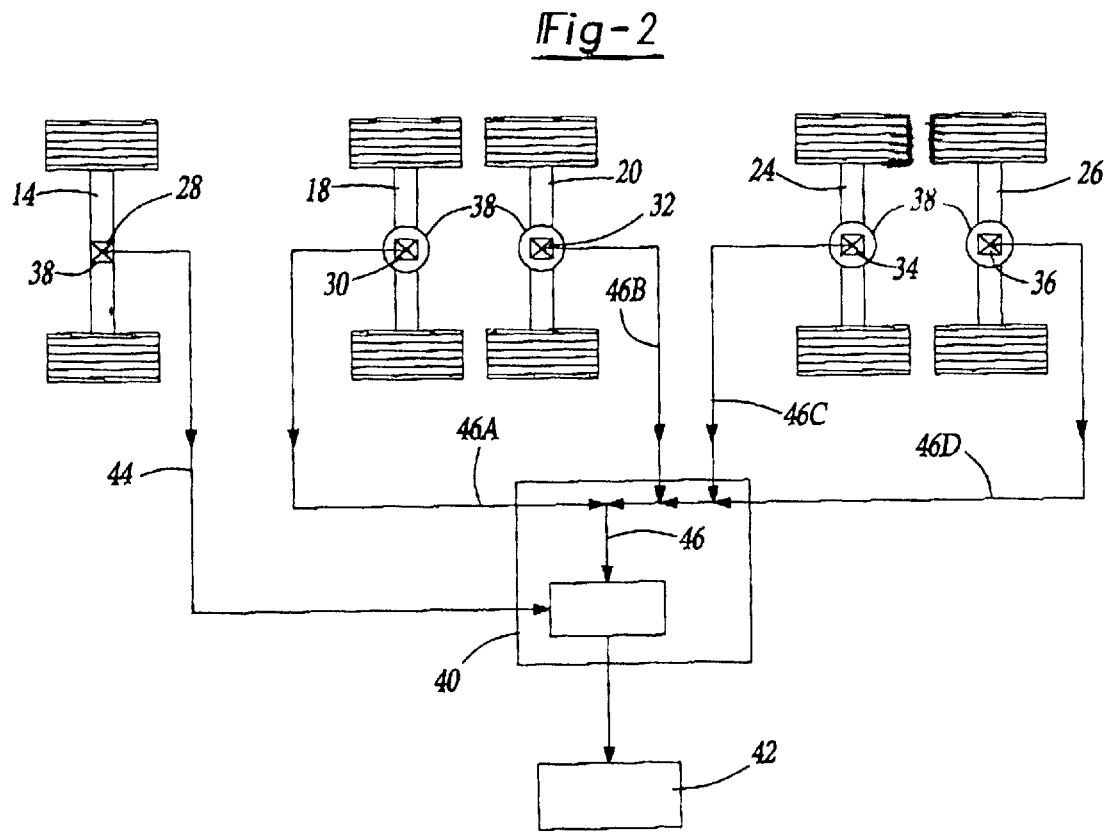

PAYLOAD MONITORING FOR A TRACTOR-TRAILER

BACKGROUND OF THE INVENTION

This application relates to a unique system for determining the weight of a vehicle by using accelerometers to measure the accelerations of the vehicle axles as the vehicle is moving.

Vehicles usually have maximum weight ratings which represent how much weight the vehicle can carry. Thus, it is important to know the weight of a vehicle during its operation. Overloading a vehicle can cause premature component wear resulting in high maintenance costs.

Often it is difficult to tell how much weight has been loaded onto a vehicle. Vehicles carry various types of cargo or payload in varying amounts. During a single day, a vehicle may transfer any of these different types of loads to various locations where a new load may be picked up and the original load removed. This loading and unloading of cargo can take place several times a day. Thus, it is important for a vehicle operator to know the vehicle weight at all times during the operation of the vehicle.

The most common method used for monitoring the weight of a vehicle is a scale. Typically, scales are located at the various sites where the vehicles are loaded or unloaded. The vehicle is driven onto the scale and the weight of the vehicle is measured while the vehicle is stationary. There are several drawbacks with this method. First, the scales are expensive and require continual maintenance to ensure proper calibration. Second, use of scales can be time consuming as there is usually only one scale per location with many vehicles waiting to be weighed. Finally, scales are not available at every location where a vehicle may be picking up a load, possibly due to the remoteness of the location or because the location is temporary. Thus, when the vehicle is loaded at such a location, an operator may not know exactly what the vehicle weight is and risks overloading the vehicle.

Another method to monitor the payload of a vehicle uses a force sensor, such as a load cell or pressure transducer. This method is expensive because it requires the vehicle to be retrofitted to include pressure sensing airbags and load cells throughout the vehicle to measure pressure and determine weight under certain known or fixed height conditions.

Thus, it is desirable to have an inexpensive system for determining the weight of a vehicle that continually monitors the vehicle weight and which is easily installed, maintained.

SUMMARY OF THE INVENTION

A unique system for determining the weight of a vehicle includes a first axle subject to a known axle weight. Typically, the front steering axle for a tractor-trailer combination vehicle is used as the first axle. The load on this axle may be considered known as the load does not vary significantly throughout the operation of the vehicle. A first accelerometer is supported on the first axle and measures the acceleration of the first axle producing a first signal. Each additional axle on the vehicle, including any single rear or tandem drive axles and any trailer axles, is provided with an accelerometer. The accelerometers measure vertical accelerations for each respective axle. Each of these additional accelerometers produces a signal representative of its respective axle accelerations and these signals are combined to produce a second signal. A processor determines the vehicle weight by comparing the second signal to the first signal.

The preferred inventive method for determining the weight of a vehicle the provides a first axle subject to a known axle weight and having a first accelerometer. At least one additional axle is provided with an additional accelerometer. A first signal is produced in response to measuring the acceleration of the first axle with the first accelerometer, and a second signal is produced in response to measuring the acceleration of the additional axle with the additional accelerometer. The vehicle weight is determined by comparing the second signal to the first signal. The vehicle weight may then be indicated to a vehicle operator.

By providing accelerometers on each axle, the present invention allows the vehicle operator to continually monitor the weight of the vehicle once some initial samples have been collected. Moreover, the system is easily installed, easily maintained and is relatively inexpensive.

BRIEF DESCRIPTION OF THE DRAWINGS

FIG. 1 side view of a vehicle using the inventive system.

FIG. 2 is a schematic overhead view of the present invention.

DETAILED DESCRIPTION OF THE PREFERRED EMBODIMENT

Heavy vehicle 10, illustrated in FIG. 1, includes a tractor 12 with a front steering axle 14 and a rear tandem drive axle 16. The front steering axle 14 can be either a non-driving axle or a driving axle. The tandem drive axle 16 is comprised of a front drive axle 18 and a rear drive axle 20. The tractor 12 pulls a trailer 22 which has a first trailer axle 24 and a second trailer axle 26. The trailer axles 24, 26 are typically non-drive axles. The invention also extends to vehicles and trailers with even more axles.

When the vehicle 10 is in the unloaded condition, each axle 14, 18, 20, 24, 26 are subject to a vertical downward force F. The front steering axle 14 is subject to a force $F_{F.A.}$, the front drive axle 18 is subject to a force $F_{A.D.1}$, the rear drive axle 20 is subject to a force $F_{A.D.2}$, the first trailer axle 24 is subject to a force $F_{A.D.3}$, and the second trailer axle 26 is subject to a force $F_{A.D.4}$. The designation F.A. refers to a first axle while the designation A.D. refers to an additional axle. These designations are used to exemplify that the inventive system, discussed in detail below, can be utilized with a minimum of two axles, a first axle and one additional axle. The system can also be used on a vehicle 10 with more than two axles, in other words the system can be used on a vehicle 10 with a first axle and a plurality of additional axles.

When the vehicle 10 is loaded such that the overall weight on each additional axle 18, 20, 24, 26 is increased, the forces $F_{A.D.1}$, $F_{A.D.2}$, $F_{A.D.3}$, and $F_{A.D.4}$ on each of these axles 18, 20, 24, 26 is also increased. This increase can be significant depending on the load. The only axle that does not experience a significant increase is the front steering axle 14. The weight on this axle 14 remains relatively constant in the unloaded and loaded conditions, however, the weight can vary depending on the point of attachment between the tractor 12 and the trailer 22. If the point of attachment is moved forward enough, it can affect the weight being carried by the front steering axle 14. The load on the front axle 14 is comprised of the weight of the engine and other engine compartment components, the weight of the vehicle cab, and the weight of the driver. Once the vehicle is built this weight does not change except for small variations due to the different weights of different drivers. However, driver weight variation is usually less than one percent for the axle 14. Thus, for the purposes of this invention the front axle 14 is preferably considered to be subject to a known or fixed load. For the case where the load changes due to the forward positioning of the attachment point between the tractor 12 and the trailer 22, the distribution of the acceleration experienced in the steering axle is compared to an expected distribution and the assumed steering axle weight is adjusted accordingly. This will be discussed in further detail below.

As shown in FIG. 2, a first accelerometer 28 is supported on the front steering axle 14 and measures the vertical acceleration of the front axle 14 as the vehicle 10 is moving. The accelerometer 28 is an instrument that measures vertical acceleration or the rate of change of velocity with respect to time and is well known in the art.

Each additional axle 18, 20, 24, 26 on the vehicle 10 also supports an accelerometer 30, 32, 34, 36. The front drive axle 18 has a front drive accelerometer 30, the rear drive axle 20 has a rear drive accelerometer 32, the first trailer axle 24 has a first trailer accelerometer 34, and the second trailer axle 26 has a second trailer accelerometer 36. In the preferred embodiment, all of the accelerometers 28, 30, 32, 34, 36 are placed near or at the center 38 of their respective axle 14, 18, 20, 24, 26. Each of the additional accelerometers 30, 32, 34, 36 measures the vertical acceleration of its respective axle 18, 20, 24, 26.

All of the accelerometers 28, 30, 32, 34, 36 are electrically linked to a central processor 40 or electronic control unit by means well known in the art. The central processor 40 is also well known in the art and is linked to an indicator 42 which displays the vehicle weight.

The system operates in the following manner. One axle weight for the vehicle 10 must be known. Since weight on the front steering axle 14 remains relatively constant when the vehicle 10 is in the loaded or unloaded condition, this is the axle that is preferably used to satisfy this requirement, however, other axles could be used. Once the vehicle 10 is moving the accelerometers 28, 30, 32, 34, 36 measure the vertical accelerations experienced by their respective axles 14, 18, 20, 24, 26. The accelerometer 28 for the front steering axle 14 (the known axle) produces a first signal 44 based on these measured accelerations. The accelerometers for each of the additional axles also produce signals 46A, 46B, 46C, 46D based on their respective measured accelerations. These signals are combined by the processor 40 to form a second signal 46. The processor 40 determines the vehicle weight by comparing the second signal 46 to the first signal 44.

Specifically, the first accelerometer 28 measures a plurality of vertical accelerations for the front axle 14 and produces a plurality of first acceleration signals. The processor 40 bases the first signal 44 on the plurality of first acceleration signals by deriving the first signal 44 from a standard deviation calculated based on the plurality of first acceleration signals. Thus, the first signal 44 is comprised of a plurality of measured acceleration signals that are compiled together in the form of a standard deviation.

Each of the additional accelerometers 30, 32, 34, 36 measures a plurality of accelerations for its respective additional axle 18, 20, 24, 26 and produces a plurality of acceleration signals for each of the additional axles 18, 20, 24, 26. Thus, signal 46A is comprised of a plurality of measured acceleration signals from front drive axle 18, signal 46B is comprised of a plurality of measured acceleration signals from rear drive axle 20, 46C is comprised of a plurality of measured acceleration signals from the first trailer axle 24, and 46D is comprised of a plurality of measured acceleration signals from the second trailer axle 26.

The second signal 46 is comprised of a summation of the standard deviations calculated for each of the signals 46A, 46B, 46C, 46D based on their respective measured plurality of accelerations. In other words, the processor 40 first calculates a standard deviation for each of the additional axles 18, 20, 24, 26 based on the plurality of acceleration signals for the respective additional axle 18, 20, 24, 26. Then the processor 40 determines the second signal 46 based on summing the standard deviations for each of the additional axles 18, 20, 24, 26.

The processor 40 compares the first signal 44, representing the standard deviation for the front axle 14 accelerations, to the second signal 46, representing the sum of the standard deviations for the additional axle 18, 20, 24, 26 accelerations, and determines the vehicle weight according to the following formula $$W_v = W_{F.A}\{1 + \{\Sigma_n \sigma_{A.D.1} + \ldots + \sigma_{A.D.n}\}/\sigma_{F.A}\}.$$

$W_v$ is the vehicle weight, $W_{F.A}$ is the known axle weight of the first axle (the front axle), $\sigma_{F.A.}$ is the standard deviation calculated for the first axle, and $\Sigma_n \sigma_{A.D.1} + \ldots + \sigma_{A.D.n}$ represents the summation of the standard deviations determined for each additional axle in which n represents an integer of the series n=1, 2, 3, . . . , and is equal to the number of additional axles.

This formula is based on physical observations that have been converted to mathematics., i.e., it has been observed that the behavior of the axles on the vehicle is load dependent. The vertical displacement experienced by an axle is much smaller when the axle has a heavy load than when it has a light load, thus the vertical accelerations are different for heavy loads and light loads. This means that a Gaussian or normal curve, comprised of a population of acceleration measurements made for each axle, is narrower for a heavy load than for a light load.

As is well known in the art, a Gaussian curve is the bell-shaped curve corresponding to a population which has a normal distribution. The determination of a normal distribution is well known in the art and is based on the mean and variance of the population in relation to the specific data point in the population.

Other factors such as speed and road conditions can affect the acceleration measurements. However, because the measurements are taken continuously while the vehicle is moving, the road conditions are the same for every axle. Also, the speed for each wheel will be the same, taking into account the possibility of having different tire sizes on the same vehicle.

A single data point in the population corresponds to a single acceleration measurement for an axle. An entire population is representative of a multitude of acceleration measurements. Enough data points need to be collected for each axle to be able to properly fit a Guassian curve for that axle. The number of data points needed can vary. For testing purposes an accelerometer took one hundred (100) measurements per second for ten (10) to twenty (20) minutes. This testing criteria resulted in the collection of a significant amount of data. It should be understood that the criteria discussed above is only one set of criteria and that many other sets of criteria could be used to determine the Guassian curve such as taking more or less than one hundred (100) acceleration measurements per second and for more than twenty minutes or less than 10 minutes.

Once a population has been collected for each axle, the standard deviation for that axle is determined. As it is well known in the art, the standard deviation represents the positive square root of the expected value of the square of the difference between a random variable, in this case the vertical accelerations, and its mean.

Thus, based on the observations discussed above, there is a relationship between the weight of the vehicle and the standard deviations determined for each axle, i.e., the weight of the vehicle is proportional to the standard deviations:

$$\frac{W_V}{\sigma_{total}} = \frac{W_{F.A.}}{\sigma_{F.A.}} = \frac{W_{A.D.1}}{\sigma_{A.D.1}} = \frac{W_{A.D.2}}{\sigma_{A.D.2}} = \frac{W_{A.D.3}}{\sigma_{A.D.3}} = \frac{W_{A.D.4}}{\sigma_{A.D.4}}$$

In order to determine the total vehicle weight, $W_v$, based on the standard deviations, one of the axle weights needs to be known. In a tractor-trailer combination, typically the weight on the front steering axle is known because the weight is based on the weight of the engine and other engine compartment components, the weight of the cab, and the weight of the driver. This weight is determined when the vehicle is built and can be pre-programmed into the central processor 40. This weight on the front axle does not vary significantly during loaded and unloaded conditions and any weight variation due to the different weights of the drivers is typically less than one percent.

As previously mentioned, for the case where the load changes due to the forward positioning of the attachment point between the tractor 12 and the trailer 22, the distribution of the acceleration experienced in the steering axle is compared to an expected distribution and the assumed steering axle weight is adjusted accordingly. Specifically, the front steering axle vertical accelerations can be measured for the tractor 12 alone (no trailer 22 attached) for a typical interstate duty cycle at a given vehicle speed, for example, fifty miles per hour. These measurements become reference measurements, $W_{F.A.ref}$ and $\sigma_{F.A.ref}$. The front axle weigh, $W_{F.A.ref}$ is known, as discussed above, and the vertical acceleration measurements in this situation are taken so that a baseline standard deviation can be determined for comaprison to a front steering axle 14 with a trailer 22 attached to the tractor 12. Next, a trailer 22 is hitched to the tractor 12 and the same interstate duty cycle is run at the same speed. Vertical accelerations are measured and the axle weight is estimated based on comparing the vertical acceleration measurements for the front axle without a trailer 22 attached, to the vertical acceleration measurements for the front axle with the trailer 22 attached, $W_{F.A.ref}/\sigma_{F.A.ref} = W_{F.A.}/\sigma_{F.A.}$. Thus, the weight effect on the front steering axle 14 due to the forward attachment of the trailer 22 on the tractor 12 is estimated according to the formula:

$$W_{F.A.} = \sigma_{F.A.}/\sigma_{F.A.ref}$$

This is just one possible way to estimate the weight effect on the front steering axle 14 of a forward attachment of the trailer 22 to the tractor 12. Another possible way would be to measure the weight of the front steering axle 14 (on a tractor 12 with a trailer 22 attached) on a scale. This weight measurement would then be programmed into the central processor 40 and would become the known axle weight. Only this one axle would have to be measured on the scale, the additional axle weight and the total vehicle weight would then be determined according to the inventive method.

Finally, tractors 12 equipped with air suspension do have air bags in the drive axle 16 to make the driver's ride as comfortable as possible. The effect on the air bag pressure will can be measured to determine the weight of the drive axle. Thus, any axle weight can be determined if it includes a air suspension air bag. This means that axles other than the front steering axle 14 can be used as the known axle weight.

The formula used to calculate the total vehicle weight, was determined by trying various ratios between the weight and the standard deviations. A one to one ratio was found to be typical, i.e., if there was ten times the weight on an axle then the Gaussian curve was ten times narrower, as shown by the ratios between the axle weights and the standard deviation discussed above. Specifically, the following derivation was used. The total vehicle weight, is equal to the sum of the weights on each axle: $W_v = W_{F.A.} + W_{A.D.1} + W_{A.D.2} + W_{A.D.3} + W_{A.D.4}$. Thus, using this formula along with the proportional relations shown above, the following formula is derived:

$$W_v = (\sigma_{total}/\sigma_{F.A.})W_{F.A.} = \{\sigma_{F.A.} + \Sigma_n \sigma_{A.D.1} + \ldots + \sigma_{A.D.n}\}W_{F.A.} = [\{1 + \Sigma_n \sigma_{A.D.1} + \ldots + \sigma_{A.D.n}\}/\sigma_{F.A.}]W_{F.A.}$$

This formula, $W_v = W_{F.A.}\{1 + \{\Sigma_n \sigma_{A.D.1} + \ldots + \sigma_{A.D.n}\}/\sigma_{F.A.}\}$, has been experimentally tested and proven to be accurate within one percent.

One advantage of determining the axle weights based on acceleration measurements taken while the vehicle is moving is that the dynamic axle load is measured for each axle. As long as the weight of one axle is known, all of the additional axle weights are known. In general, $W_v = W_i[1 + \{\Sigma_n \sigma_{Ai}/\sigma_{Ai}\}]$, where $W_i$ is the weight on axle "i" and $\sigma_{Ai}$ is the standard deviation of the vertical accelerations measured on axle "i." Thus, individual axle weights can be continuously monitored throughout the operation of the vehicle to determine whether loads are shifting. While these dynamic axle loads measured as the vehicle moves can vary, the total dynamic vehicle weight will be equal to the total static vehicle weight.

The inventive method for determining the weight of the vehicle 10 is comprised of the following steps: (1) providing the first axle 14 subject to a known axle weight and having a first accelerometer 28 and providing at least one additional axle 18, 20, 24, or 26 having an additional accelerometer 30, 32, 34, or 36, (2) producing a first signal 44 in response to measuring the acceleration of the first axle 14 with the first accelerometer 28, (3) producing a second signal 46 in response to measuring the acceleration of the additional axle 18, 20, 24, or 26 with the additional accelerometer 30, 32, 34, or 36, (4) determining the vehicle weight by comparing the second signal 46 to the first signal 44, and (5) indicating the vehicle weight to the vehicle operator.

Additional steps include placing the first accelerometer 28 adjacent to a center 38 of the first axle 14 and placing the additional accelerometer 30, 32, ,34, or 36 adjacent to the center 38 of the additional axle 18, 20, 24, or 26. As previously mentioned, a plurality of additional axles 18, 20, 24, and 26 can be provided instead of having just one additional axle 18, 20, 24, or 26, with each additional axle 18, 20, 24, and 26 having a respective accelerometer 30, 32, 34, and 36 placed near the center 38 of the axle 18, 20, 24, and 26.

An additional signal 46A, 46B, 46C, 46D is respectively produced for each additional axle 18, 20, 24, 26 in response to measuring the acceleration of each additional axle 18, 20, 24, 26 and the second signal 46 is determined by summing the additional signals 46A, 46B, 46C, 46D for each additional axle 18, 20, 24, 26.

Specifically, the method further includes the steps of: producing a plurality of first acceleration signals by measuring a plurality of accelerations of the first axle 14, determining the first signal 44 based on a standard deviation calculated from the plurality of first acceleration signals, producing a plurality of acceleration signals for each additional axle by measuring a plurality of accelerations for each additional axle 18, 20, 24, 26, determining a standard deviation for each additional axle 18, 20, 24, 26 based on the plurality of accelerations signals for each additional axle 18, 20, 24, 26, and determining the second signal 46 based on summing the standard deviations for each additional axle 18, 20, 24, 26.

In summary, the present invention provides a system which continuously monitors the weight of a vehicle 10 while the vehicle 10 is in motion. This system is easily installed and maintained and is inexpensive.

While a preferred vehicle configuration has been disclosed, it should be understood that the inventive system can be used with a minimum of two axles and can also be used with any number of additional axles.

Preferred embodiments of this invention have been disclosed, however, a worker of ordinary skill in the art would recognize that certain modifications would come within the scope of this invention. For that reason the following claims should be studied to determine the true scope and content of this invention.

We claim:

1. A method for determining the weight of a vehicle comprising the steps of:
   1) providing a first axle subject to a known axle weight and having a first accelerometer and providing at least one additional axle having an additional accelerometer;
   2) producing a first signal in response to measuring the acceleration of the first axle with the first accelerometer;
   3) producing a second signal in response to measuring the acceleration of the additional axle with the additional accelerometer;
   4) determining the vehicle weight by comparing the second signal to the first signal; and
   5) indicating the vehicle weight to a vehicle operator.

2. A method as recited in claim 1 further including the steps of placing the first accelerometer adjacent to a center of the first axle and placing the additional accelerometer adjacent to the center of the additional axle.

3. A method as recited in claim 1 further including the steps of providing a plurality of additional axles such that the at least one additional axle is comprised of a plurality of additional axles, each additional axle having a respective accelerometer;
   placing the first accelerometer adjacent to a center of the first axle;
   placing the accelerometers of each additional axle adjacent to a center of the respective additional axle;
   producing an additional signal for each additional axle in response to measuring the acceleration of each additional axle with its respective accelerometer; and
   determining the second signal by summing the additional signals for each additional axle.

4. A method as recited in claim 3 further including the steps of producing a plurality of first acceleration signals by measuring a plurality of accelerations of the first axle;
   determining the first signal based on a standard deviation determined from the plurality of first acceleration signals;
   producing a plurality of acceleration signals for each additional axle by measuring a plurality of accelerations for each additional axle;
   determining a standard deviation for each additional axle based on the plurality of accelerations signals for each additional axle; and
   determining the second signal based on summing the standard deviations for each additional axle.

5. A method as recited in claim 4 wherein the determination of the vehicle weight is according to the following formula $$W_v = W_{F.A.}\{1 + \{\Sigma_n \sigma_{A.D.1} + \ldots + \sigma_{A.D.n}\}/\sigma_{F.A}\}$$

wherein $W_v$ is the vehicle weight, $W_{F.A.}$ is the known axle weight of the first axle; $\sigma_{F.A.}$ is the standard deviation calculated for the first axle; and $\Sigma_n \sigma_{A.D.1} + \ldots + \sigma_{A.D.n}$ represents the summation of the standard deviations determined for each additional axle in which n represents an integer of the series n=1, 2, 3, . . . , and n is based on the number of said plurality of additional axles.

6. A system for determining the weight of a vehicle comprising
   a first axle subject to a known axle weight;
   at least one additional axle;
   a first accelerometer for measuring the acceleration of the first axle and producing a first signal;
   at least one additional accelerometer for measuring the acceleration of the additional axle and producing a second signal; and
   a processor for determining the vehicle weight by comparing the second signal to the first signal.

7. A system as recited in claim 6 including an indicator for indicating the vehicle weight to a vehicle operator.

8. A system as recited in claim 6 wherein said first axle includes a first axle center and said additional axle includes an additional axle center, said first accelerometer being supported on said first axle adjacent said first axle center and said additional accelerator being supported on said additional axle adjacent said additional axle center.

9. A system as recited in claim 6 wherein said at least one additional axle is comprised of a plurality of additional axles and said at least one additional accelerometer is comprised of a plurality of additional accelerometers whereby each additional axle supports one of said additional accelerometers for measuring the acceleration of said additional axle.

10. A system as recited in claim 9 wherein each additional accelerometer is supported adjacent to a center of its respective additional axle.

11. A system as recited in claim 10 wherein each of said additional accelerometers produces an additional signal for its respective additional axle in response to measuring the acceleration of said additional axle and said processor determines said second signal by summing the additional signals for each additional axle.

12. A system as recited in claim 11 wherein said first accelerometer measures a plurality of accelerations for said first axle and produces a plurality of first acceleration signals;
   each of said additional accelerometers measures a plurality of accelerations for its respective additional axle and produces a plurality of additional accelerations signals for each of said additional axles; and
   said processor determines said first signal based on said plurality of first acceleration signals and determines said second signal based on said plurality of said additional acceleration signals.

13. A system as recited in claim 12 wherein said processor determines the first signal based on a standard deviation derived from the plurality of first acceleration signals, determines a standard deviation for each of said additional axles based on said plurality of acceleration signals for said respective additional axle, and determines the second signal based on summing the standard deviations for each of said additional axles.

14. A system as recited in claim 13 wherein said processor determines the vehicle weight is according to the following formula $$W_v = W_{F.A.}\{1 + \{\Sigma_n \sigma_{A.D.1} + \ldots + \sigma_{A.D.n}\}/\sigma_{F.A.}\}$$

wherein $W_v$ is the vehicle weight, $W_{F.A.}$ is the known axle weight of the first axle; $\sigma_{F.A.}$ is the standard deviation calculated for the first axle; and $\Sigma_n \sigma_{A.D.1} + \ldots + \sigma_{A.D.n}$ represents the summation of the standard deviations determined for each additional axle in which n represents an integer of the series n=1, 2, 3, . . . , and n is equal to the number of additional axles.

15. A system as recited in claim 6 wherein said first axle is a steering axle.

16. A system as recited in claim 15 wherein said at least one additional axle is a driving axle.

17. A system as recited in claim 16 wherein said at least one additional axle is comprised of a plurality of additional axles including at least one drive axle and at least one trailer axle.

18. A system as recited in claim 17 wherein said at least one additional accelerometer is comprised of a plurality of additional accelerometers including a drive axle accelerometer for measuring the acceleration of said drive axle and a trailer axle accelerometer for measuring the acceleration of said trailer axle.

19. A system as recited in claim 18 wherein said first accelerometer measures a plurality of accelerations for said steering axle and produces a plurality of first acceleration signals and said processor determines said first signal based on the standard deviation derived from said plurality of first acceleration signals;

said drive axle accelerometer measures a plurality of accelerations for said drive axle and produces a plurality of drive axle acceleration signals;

said trailer axle accelerometer measures a plurality of accelerations for said trailer axle and produces a plurality of trailer axle accelerations signals;

said processor determines a drive axle standard deviation derived from said plurality of drive axle accelerations signals and determines a trailer axle standard deviation derived from said plurality of trailer axle accelerations signals, said processor determining said second signal based on a summation of said drive axle and trailer axle standard deviations; and said processor determines the weight of said vehicle by dividing said second signal by said first signal thereby producing a signal ratio, adding said signal ratio to a constant, and multiplying this quantity by the known axle weight of said steering axle.

20. A system for determining the weight of a vehicle comprising a front axle subject to a known axle weight and having a first accelerometer for measuring the acceleration of said front axle and producing a first signal;

at least one drive axle having a second accelerometer for measuring the acceleration of said drive axle and producing a drive axle signal;

a least one trailer axle having a third accelerometer for measuring the acceleration of said trailer axle and producing a trailer axle signal; and a processor which combines said drive axle signal and said trailer axle signal to form a second signal, said processor determining the vehicle weight by comparing said second signal to said first signal.

* * * * *